United States Patent
Lee et al.

(10) Patent No.: US 9,030,307 B1
(45) Date of Patent: May 12, 2015

(54) APPARATUS FOR GENERATING HAPTIC FEEDBACK

(71) Applicant: Center of Human-Centered Interaction for Coexistence, Seoul (KR)

(72) Inventors: Kwang Kyu Lee, Gyeonggi-do (KR); Shin Young Kim, Seoul (KR); Dae Keun Yoon, Seoul (KR); Jai Hi Cho, Seoul (KR); Bum Jae You, Seoul (KR)

(73) Assignee: Center Of Human-Centered Interaction For Coexistence, Seoul (KR)

( * ) Notice: Subject to any disclaimer, the term of this patent is extended or adjusted under 35 U.S.C. 154(b) by 0 days.

(21) Appl. No.: 14/574,367

(22) Filed: Dec. 17, 2014

(30) Foreign Application Priority Data

Sep. 3, 2014 (KR) .......................... 10-2014-0117294

(51) Int. Cl.
*H04B 3/36* (2006.01)
*G06F 3/01* (2006.01)
*G06F 3/0346* (2013.01)

(52) U.S. Cl.
CPC .............. *G06F 3/016* (2013.01); *G06F 3/017* (2013.01); *G06F 3/014* (2013.01); *G06F 3/0346* (2013.01)

(58) Field of Classification Search
CPC ......... G06F 3/014; G06F 3/016; G06F 3/017; G06F 3/0346

USPC ....................................................... 340/407.1
See application file for complete search history.

(56) References Cited

U.S. PATENT DOCUMENTS

| | | | |
|---|---|---|---|
| H2017 H * | 4/2002 | Repperger et al. | 345/161 |
| 8,022,925 B2 * | 9/2011 | Lee et al. | 345/156 |
| 2003/0234823 A1 * | 12/2003 | Sato et al. | 345/848 |
| 2007/0290988 A1 * | 12/2007 | Nogami et al. | 345/156 |
| 2008/0136775 A1 * | 6/2008 | Conant | 345/156 |
| 2009/0096746 A1 * | 4/2009 | Kruse et al. | 345/156 |
| 2014/0274397 A1 * | 9/2014 | Sebastian | 463/37 |

* cited by examiner

*Primary Examiner* — Steven Lim
*Assistant Examiner* — Omeed Alizada
(74) *Attorney, Agent, or Firm* — Husch Blackwell LLP

(57) ABSTRACT

An apparatus for generating haptic feedback, includes: multiple haptic units placed on a first portion of a body; and a control unit placed on a second portion, near the first portion, of the body, wherein the control unit includes: a first module for acquiring information on relative position (i) among the respective multiple haptic units and (ii) between the respective haptic units and the control unit, a second module for acquiring information on absolute position of the control unit by measuring a position of the control unit in reference to an external reference point, and a haptic command module for creating a command signal by referring to at least one piece of the information on relative position acquired by the first module and the information on absolute position acquired by the second module and delivering the created command signal to a corresponding haptic unit among all the multiple haptic units.

9 Claims, 3 Drawing Sheets

APPARATUS FOR GENERATING HAPTIC FEEDBACK

CROSS REFERENCE TO RELATED APPLICATION

This application claims priority to and incorporates herein by reference all disclosure in Korean Patent Application No. 10-2014-0117294 filed Sep. 3, 2014.

FIELD OF THE INVENTION

The present invention relates to an apparatus for generating haptic feedback; and more particularly, to the apparatus for generating the haptic feedback including multiple haptic units on a first portion of a body and a control unit disposed in a second portion near the first portion, wherein the control unit includes a first module for acquiring information on relative position among the respective multiple haptic units and information on relative position between the haptic units and the control unit, if being measured, a second module for acquiring information on position and posture of the control unit, which is measured by referring to an external reference point, as information on absolute position, and a haptic command module for creating a command signal by referring to at least one piece of the information on relative position acquired by the first module and the information on absolute position acquired by the second module and delivering the created command signal.

BACKGROUND OF THE INVENTION

A virtual environment is a concept of including a virtual object and any virtual circumstances. Haptic properties of the virtual environment include material properties, dynamic force effects, tactile properties, etc.

The material properties include stiffness, static friction, dynamic friction, damping factor, haptic texture, etc. of the virtual environment and the dynamic force effects include mass, force field, etc. thereof.

In addition, the tactile properties include vibration, tactile patterns, etc. thereof.

Based on the haptic properties of the virtual environment defined as such, tactile information may be provided to a user through a haptic device. If the user in the virtual environment touches a virtual soft doll therein, the feeling of the soft property may be delivered and provided to the user as well.

Of course, if such soft feeling of the virtual object is provided to the user, the virtual object could be provided more realistically, but there was a problem of determining at which position and to which degree tactile sense is desirable to be generated.

Therefore, the present inventor intends to propose a technology of creating and generating force feedback at proper intensity at an optimal position to solve the aforementioned problem.

SUMMARY OF THE INVENTION

It is an object of the present invention to solve all the problems mentioned above.

It is another object of the present invention to create accurate tactile sense at an exact position based on a motion of a user who uses an apparatus for generating force feedback.

It is still another object of the present invention to express a feeling of the user who uses the apparatus for generating force feedback when the user holds a virtual object in the user's hand or generate tactile information upon any interaction with the virtual object located out of the user's hand.

In accordance with one aspect of the present invention, there is provided an apparatus for generating haptic feedback, including: multiple haptic units placed on a first portion of a body; and a control unit placed on a second portion, near the first portion, of the body, wherein the control unit includes: a first module for acquiring information on relative position (i) among the respective multiple haptic units and (ii) between the respective haptic units and the control unit, a second module for acquiring information on absolute position of the control unit by measuring a position of the control unit in reference to an external reference point, and a haptic command module for creating a command signal by referring to at least one piece of the information on relative position acquired by the first module and the information on absolute position acquired by the second module and delivering the created command signal to a corresponding haptic unit among all the multiple haptic units.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
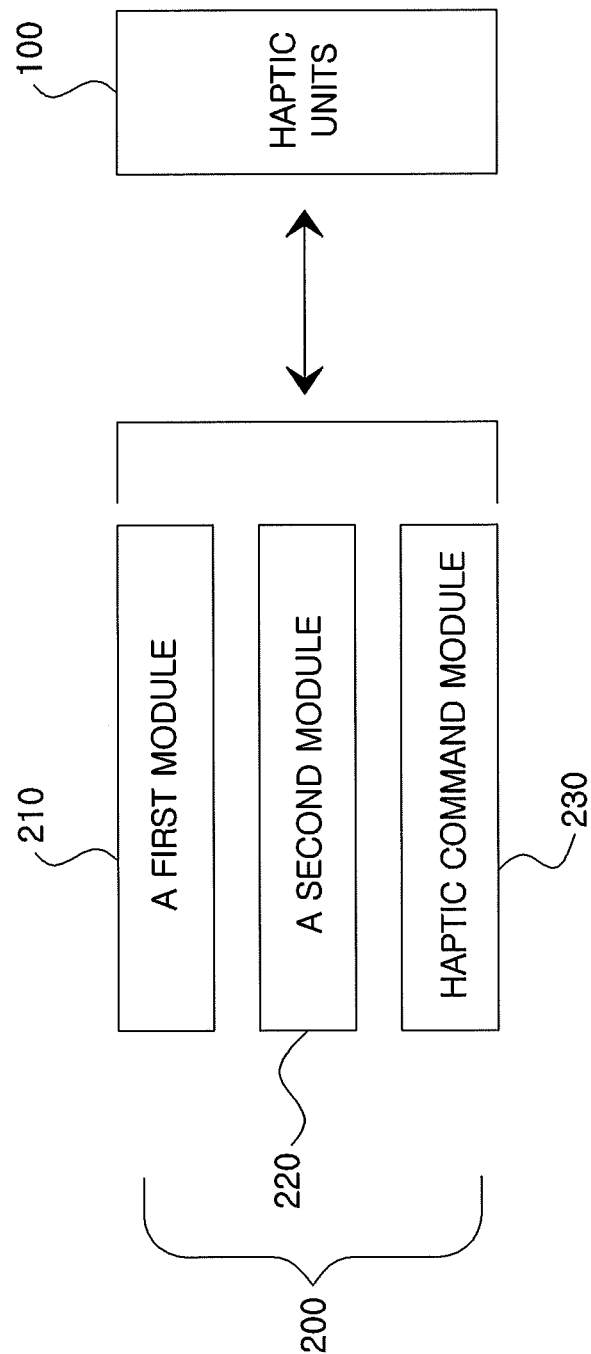
FIG. 1 is a schematic drawing simply showing an internal configuration of a control unit included in an apparatus for generating force feedback and a haptic unit interacting with the control unit in accordance with one example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 briefly shows an internal configuration of an apparatus for generating force feedback in accordance with one example embodiment of the present invention.

The apparatus for generating force feedback in accordance with one example embodiment of the present invention may include multiple haptic units 100 and a control unit 200. In addition, the control unit 200 may include a first module 210, a second module 220, and a haptic command module 230.

The multiple haptic units 100 may be placed on multiple spots in a first portion of a body. As explained later, information on positions of the multiple spots at which the multiple haptic units 100 are placed respectively may be acquired.

Figure 2:
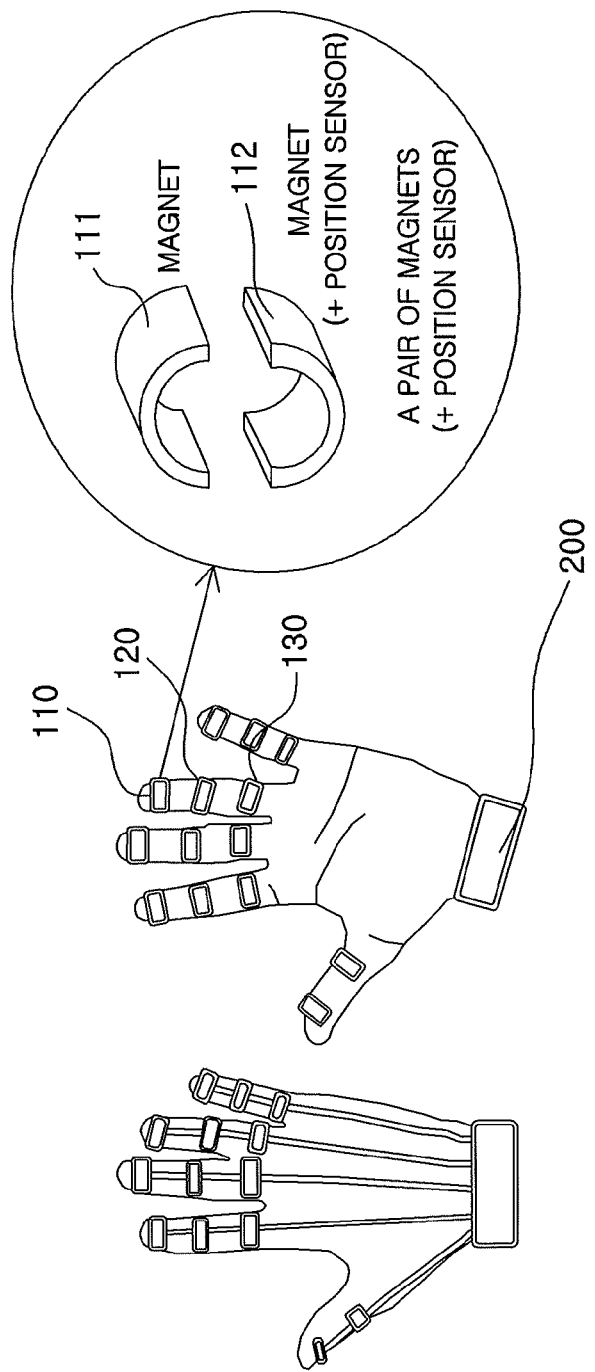
FIG. 2 exemplarily shows a state of wearing of the apparatus for generating force feedback in accordance with an example embodiment of the present invention.

More specifically, each of the haptic units 100 may include a pair of magnets which generate a magnetic field and a position sensor for identifying a position of the pair of magnets as shown in FIG. 2. At the time, identifiers may be assigned respectively to the position sensors of the haptic units 100 so that information on positions and postures of the respective haptic units 100 could be acquired.

The control unit 200 may be located on a second portion near the first portion. Besides, the control unit 200 may include the first module 210, the second module 220, and the haptic command module 230 as stated above.

More specifically, the first module 210 may acquire information on relative position among the respective multiple haptic units 100 and information on relative position between the haptic units 100 and the control unit 200 and the second module 220 may acquire information on a position and a posture of the control unit 200, as information on absolute position, if being measured by referring to an external reference point.

Besides, the haptic command module 230 may create a command signal by referring to at least one piece of the information on relative position acquired by the first module 210 and the information on absolute position acquired by the second module 220 and deliver the created command signal. At the time, the haptic command module 230 may create the command signal by additionally referring to at least one piece of information on position and information on physical properties of a virtual object. Of course, the position information of the virtual object may include information on a location, a size and a shape thereof, but it is not limited to these.

For example, the first portion may correspond to a hand portion and the second portion may correspond to a wrist portion.

In order to provide force feedback for a virtual object placed in the user's hand, the haptic command module 230 could acquire information on a position and a posture of the user's hand by referring to the acquired information on relative position and then create a command signal by referring to the information on the position and the posture of the user's hand and the information on a position and physical properties of the virtual object. Accordingly, force feedback for the virtual object located in the user's hand may be provided by referring to the created command signal. At the time, information on the physical properties of the virtual object would be referred to as information on stiffness, surface roughness, shape, etc.

In order to provide force feedback for a virtual object located out of the user's hand, the haptic command module 230 could acquire information on a position and a posture of the user's hand by referring to the acquired information on relative position and the acquired information on absolute position and then create a command signal by referring to the information on the position and the posture of the user's hand and the information on a position and physical properties of the virtual object. Accordingly, force feedback for the virtual object located out of the user's hand may be provided by referring to the created command signal.

At the time, the information on relative position and the information on absolute position could be acquired by sensors located in the haptic units 100 and those located in the control unit 200 or by image processing using leap motion or vision.

FIG. 2 shows an example of wearing the apparatus for generating force feedback in accordance with one example embodiment of the present invention and the detailed configuration can be explained as follows:

First, the second portion where the control unit 200 is located may be a joint part near the first portion where the respective haptic units 110, 120, and 130 are located. For example, by referring to FIG. 2, the first portion may include multiple parts, i.e., multiple finger joints, where the respective haptic units are located, and the second portion may be a joint part, i.e., a wrist joint, near the first portion.

In accordance with one example embodiment of the present invention, each of the haptic units could be formed in a form of a ring with a pair of magnets 111 and 112 and may include a position sensor as well. In FIG. 2, only haptic units 110, 120, 130 are numbered and only haptic elements 111, 112 which are included in the haptic unit 110 are numbered as examples. At the time, the pair of magnets as the haptic elements may generate various patterns of haptic effects, such as various patterns of position (which haptic elements among all haptic elements are determined to provide haptic effects), vibration frequency, intensity, etc. by using at least one haptic driving part. Herein, the respective haptic driving parts may be included in the respective haptic units or one haptic driving part may exist outside the haptic units to control all the haptic units. In addition, each position sensor which may be included in each of the haptic units may be an encoder or a flexible band sensor capable of being worn on each of the finger joints with the pair of magnets 111 and 112, but it is not limited thereto. In accordance with the present invention, positions of all the pairs of magnets may be measured by using an external position sensor such as a contactless magnetic sensor, a motion capture sensor, etc.

In accordance with the present invention, the control unit 200 may be also configured in a form of a wristband which wraps around a wrist and may also include a wired or a wireless transceiver and a communication part which may send and receive data to/from outside. Additionally, the control unit 200 may also communicate with all the haptic units by connecting with them in a wired or a wireless network.

As stated above, the haptic command module 230 of the control unit 200 may create at least one command signal by referring to the acquired position information, i.e., information on the positions of all the pairs of magnets. At the time, the created command signal may include information on which of the pairs of magnets is provided with which haptic effects. Further, the haptic command module 230 of the control unit 200 may create the command signal by additionally referring to a physical property of the virtual object such as size, stiffness, geometry thereof, etc.

For example, the intensity and the magnitude of the tactile information to be fed back may be determined linearly or non-linearly by using an equation: $M = S*D + M0$, where M is the intensity of the created tactile information; M0 is an initial or a basic value of the created tactile information; S is a scaling factor of the tactile information determined by physical properties; and D is a difference between relative distance among the haptic units and the dimension of the virtual object, or the relatively moved distance among the haptic units which are in contact with the virtual object.

In accordance with the present invention, if a value of the distance which may be measured by referring to information on relative positions of the haptic units in contact with the virtual object is determined to be shorter than a predetermined value, since it can be thought that the user is holding the virtual object by largely flexing his or her fingers, the generated magnitude of the force feedback may be increased. If the value of the distance is larger than a prescribed value, since as it can be thought that the user is holding the virtual object by slightly flexing his or her fingers, the generated magnitude of the force feedback may be reduced. Herein, it is assumed that the virtual object is close to the hand and it may be located in the hand when the user flexes his or her fingers. However, if it is assumed that the virtual object is located out of the hand, the force feedback provided to the respective haptic units are different according to the positions of the respective haptic units. For example, if a distance between a certain haptic unit and the virtual object becomes closer, the force feedback provided to the certain haptic unit could be larger. Of course, if the distance therebetween becomes farther, the force feedback provided thereto could be smaller. Surely, not only the intensity of the force feedback but also various tactile senses such as senses of vibration, twist, etc. could be generated to be different depending on the distances corresponding to the respective haptic units. Besides, this may be expressed as a feeling as if the virtual object is held and the stiffness, surface roughness, etc. of the virtual object could be expressed.

Figure 3:
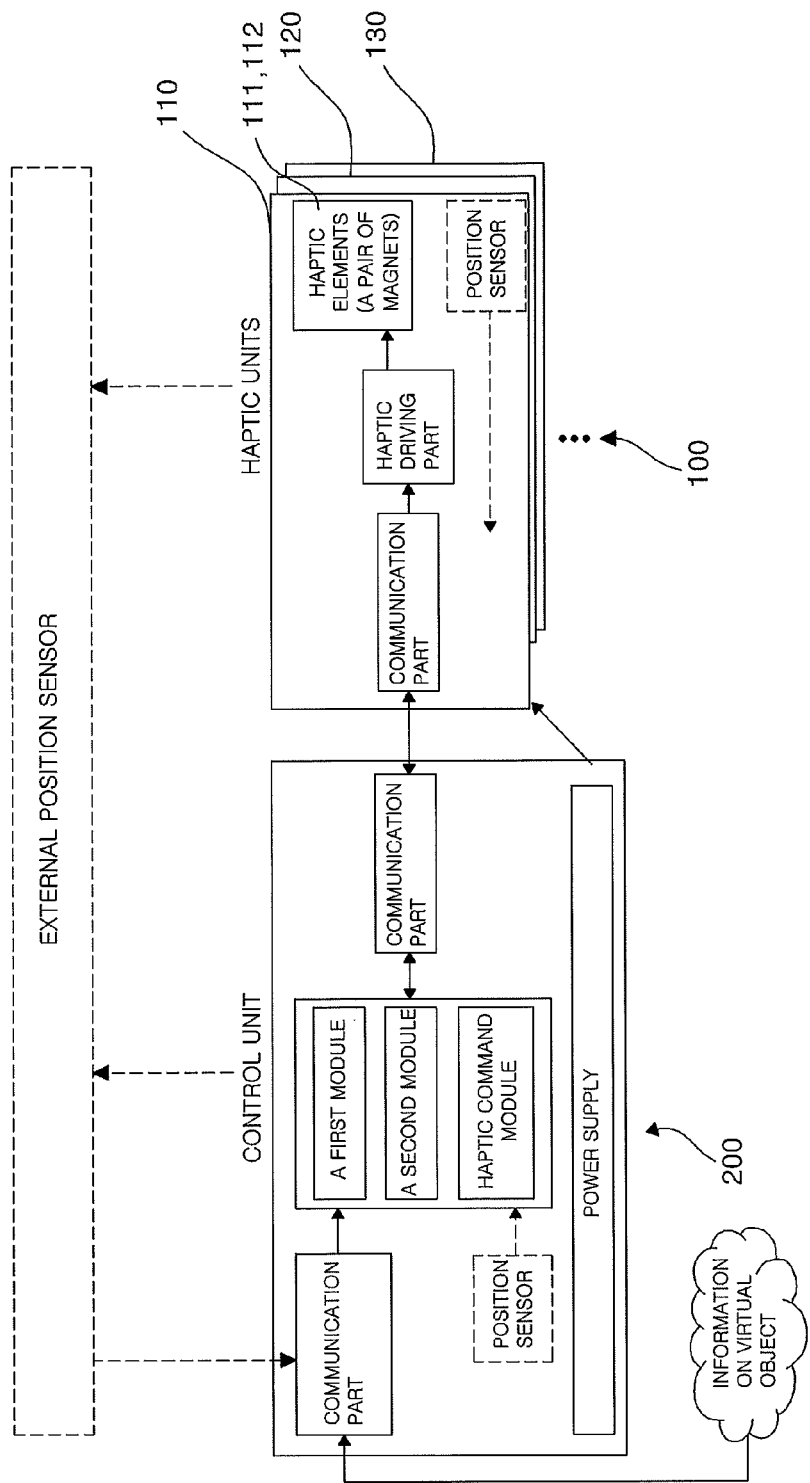
FIG. 3 is a detail drawing that shows internal configurations of the control unit and the haptic unit included in the apparatus for generating force feedback in accordance with an example embodiment of the present invention.

FIG. 3 shows an internal configuration of the apparatus for generating force feedback in accordance with an example embodiment of the present invention. As a detailed internal configuration of the apparatus for generating force feedback, the haptic units 100 and the control unit 200 are provided as an example.

In accordance with one example embodiment of the present invention, the apparatus for generating force feedback includes the haptic units 100, worn on finger joints, for providing haptic feedback and the wristband-type control unit 200 capable of generating a command signal by referring to the information on the virtual object and the information on the respective positions of the haptic units 100. More specifically, each of the haptic units 100 may generate various types of haptic feedback by using corresponding haptic elements, i.e., each pair of magnets. Each of the haptic units 100 may include the haptic driving part and the communication part. Even with a position element such as the position sensor, each haptic unit 100 may measure the position thereof. Of course, the position sensor could be implemented outside the haptic units 100. Furthermore, each communication could be implemented in a wired or a wireless network and even the position sensor of the control unit 200 could also be implemented outside the control unit 200. By acquiring position information from the position sensors corresponding to the control unit 200 and/or the haptic units 100, the control unit 200 could also acquire information on the absolute position of each unit, i.e., the control unit 200 and/or each haptic unit 100, on space as well as information on the relative position of each unit, i.e., the control unit 200 and/or each haptic unit 100. Besides, the power of the apparatus for generating force feedback could be also supplied by installing a battery in the control unit 200 or by external power supply. As another example, individual power supply could be implemented by installing a small battery in each of the units, i.e., the control unit 200 and/or the haptic units 100.

In accordance with the present invention, in order to provide the haptic feedback for the physical properties of the virtual object located in the hand, the control unit 200 may refer to only information on the relative positions among the haptic units 100. In this case, the control unit 200 may not refer to information on the absolute positions of the haptic units 100 in space.

Besides, in accordance with the present invention, in order to provide the haptic feedback for the physical properties of the virtual object located out of the hand, the control unit 200 may allow the information on relative positions among the haptic units 100 and the control unit 200 to be calculated and then the calculated information on the relative positions to be converted into information on absolute positions of the haptic units 100 and the control unit 200. Thereafter, the control unit 200 may create a command signal for instructing each haptic unit 100 by referring to the information on the absolute position of each haptic unit 100 and the virtual object and information on the physical properties of the virtual object. Thereafter, the created command signal may be provided to the corresponding haptic unit 100 so that the haptic feedback can be provided to the corresponding haptic unit 100 by driving the pair of magnets included therein through the haptic driving part thereof.

The present invention brings the effect of making a user interacting with a virtual object get a sense of reality and presence by referring to at least one piece of the information on relative position among the user's finger joints and the information on absolute position of the user's respective finger joints and also by referring to size, shape, physical properties, etc. of the virtual object.

The present invention also has the effect of clearly expressing the physical properties of the virtual object by creating tactile sense depending on the accurate position information when the user holds on a hand or touches the virtual object and increasing the interest of the user by being used as a user interface in fields of games, entertainment, online shopping, etc. because it elaborately creates the senses of pressure, vibration, twist, etc.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. An apparatus for generating haptic feedback, comprising: multiple haptic units placed on a first portion of a body; and
a control unit placed on a second portion, near the first portion, of the body, wherein the control unit includes:
a first module for acquiring information on relative position (i) among the respective multiple haptic units and (ii) between the respective haptic units and the control unit, a second module for acquiring information on absolute position of the control unit by measuring a position of the control unit in reference to an external reference point, a haptic command module for creating a command signal by referring to at least one piece of the information on relative position acquired by the first module and the information on absolute position acquired by the second module and delivering the created command signal to a corresponding haptic unit among all the multiple haptic units; and wherein the haptic command module creates the command signal by referring to at least one piece of the information on relative position acquired by the first module and the information on absolute position acquired by the second module and further referring to at least one piece of information on position and physical properties of a virtual object for interaction.

2. The apparatus of claim 1, wherein each haptic unit includes: a pair of magnets for generating a magnetic field by interaction and a position sensor for identifying the information on the position of the pair of magnets relevant to the respective positions of the multiple haptic units.

3. The apparatus of claim 2, wherein each identifier is assigned to each position sensor and the position of each haptic sensor is acquired by referring to the assigned identifier.

4. The apparatus of claim 1, wherein the second portion is a joint part near the first portion.

5. The apparatus of claim 4, wherein the first portion includes multiple finger joints and the second portion is a wrist joint.

6. The apparatus of claim 1, wherein the information on the position of the virtual object includes information on a location, a size and a shape of the virtual object.

7. The apparatus of claim 1, wherein, if the first portion includes multiple finger joints in a hand region and the second portion is a wrist, in order to provide force feedback for a virtual object located in the hand region, the haptic command module acquires information on position and posture of the hand by referring to the acquired information on relative position and then creates the command signal by referring to the acquired information on relative position and information on a position and physical properties of the virtual object.

8. The apparatus of claim 1, wherein, if the first portion includes multiple finger joints in a hand region and the second portion is a wrist, in order to provide force feedback for a virtual object located out of the hand region, the haptic command module acquires information on position and posture of the hand by referring to the acquired information on relative position and the acquired information on absolute position and then creates the command signal by referring to the acquired information on relative position, the acquired information on absolute position and information on a position and physical properties of the virtual object.

9. The apparatus of claim 1, wherein the information on relative position and the information on absolute position is acquired by sensors located in the haptic units and a sensor located in the control unit or by image processing.

* * * * *